United States Patent [19]
Bergeron

[11] 3,773,301
[45] Nov. 20, 1973

[54] METHOD OF PREPARING ASBESTOS SLURRY

[75] Inventor: Grafton L. Bergeron, Midland, Mich.

[73] Assignee: The Dow Chemical Company, Midland, Mich.

[22] Filed: June 2, 1972

[21] Appl. No.: 259,293

[52] U.S. Cl. ............................ 259/4, 259/DIG. 17
[51] Int. Cl. ........................... B01f 5/00, B01f 13/02
[58] Field of Search ........................ 259/1 R, 4, 147, 259/151, DIG. 17; 162/153, 154, 155

[56] References Cited
UNITED STATES PATENTS
2,605,084   7/1952   Reents et al. ...................... 259/4 X
3,202,281   8/1965   Weston .............................. 259/4 X Primary Examiner—Harvey C. Hornsby
Assistant Examiner—Alan I. Cantor
Attorney—William M. Yates et al.

[57] ABSTRACT

The invention is a method of preparing a pumpable slurry of asbestos fibers. The fibers are wetted, then placed into a holding tank, suitable liquid also being placed in the holding tank.

The liquid and fibers are then aspirated into an enclosed mixing chamber and air is moved from the holding tank through the liquid and fibers in the mixing tank. The liquid-fiber mixture is then recycled to the holding tank and the aspirating-air movement, recycling procedure repeated several times until the slurry is completely mixed.

This slurry preparation method eliminates health hazards, doesn't break up the asbestos fibers as do bladed mixer devices, and provides a very well mixed slurry.

4 Claims, 1 Drawing Figure

PATENTED NOV 20 1973 3,773,301
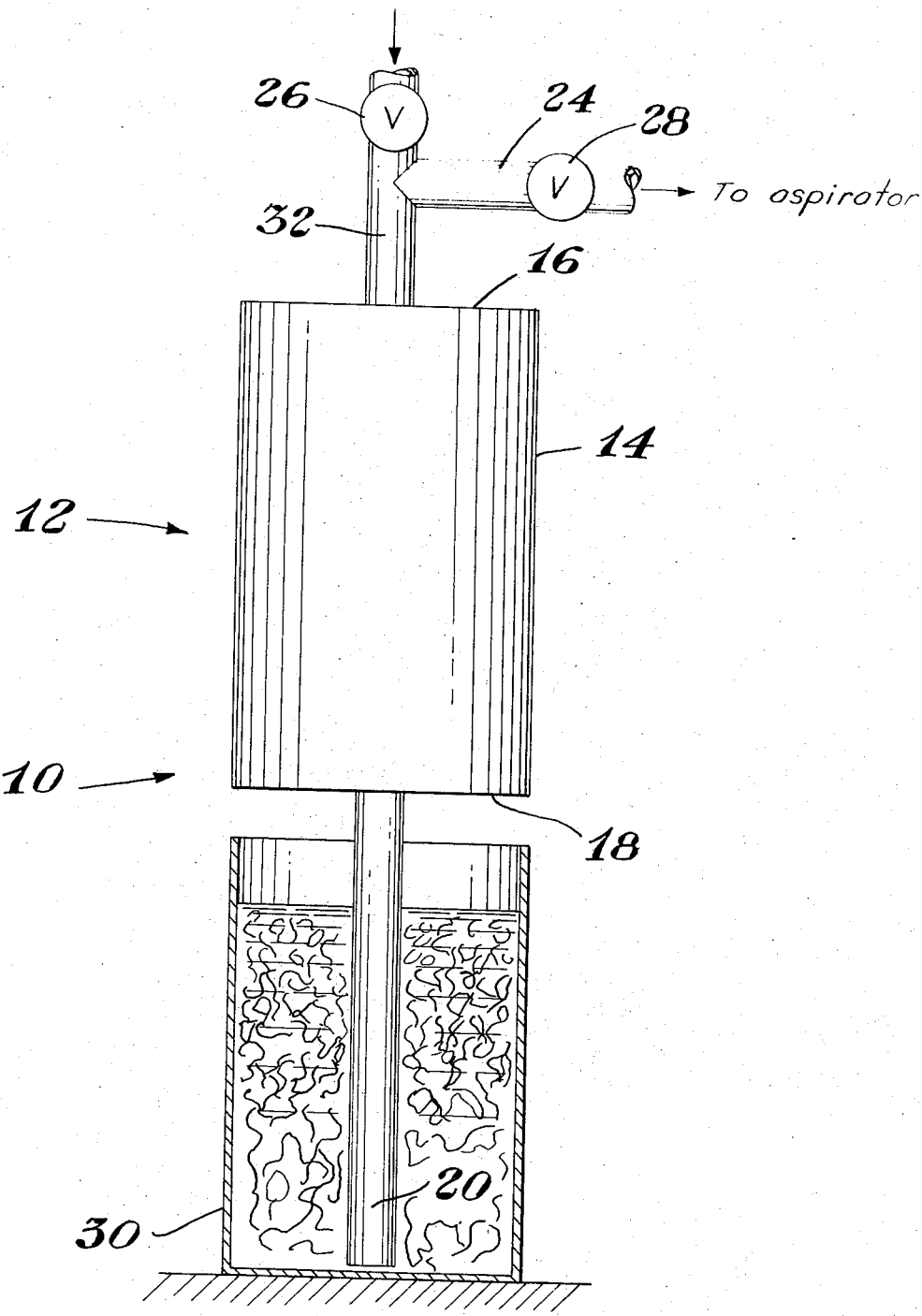

METHOD OF PREPARING ASBESTOS SLURRY

BACKGROUND OF THE INVENTION

This invention relates to asbestos slurries and particularly to an improved method of preparing such slurries.

Asbestos slurries find wide usage in diaphragm type electrolytic cells. The asbestos fibers of such slurries desirably contain fixed proportions of fibers of various lengths.

However, when bladed mixers are used to prepare such slurries, the mechanical action of the mixer blades break up the fibers.

Further, handling of asbestos fibers represents a severe health hazard if the fibers are inhaled by persons nearby the slurry mixing operation.

OBJECTS OF THE INVENTION

A principal object of this invention is to provide an improved, safer method of preparing an asbestos slurry.

Another object of this invention is to provide an improved method of preparing an asbestos slurry which does not mutilate the fibers.

STATEMENT OF INVENTION

In accordance with this invention wetted asbestos fibers of appropriate length distribution are placed in a holding tank and a predetermined amount of suitable liquid is added to the tank.

The contents of the holding tank are then aspirated into an enclosed mixing chamber and air from the holding tank is bubbled through the fibers and liquid. Aspiration is discontinued and the contents of the mixing chamber are returned to the holding tank.

The steps of aspirating the liquid and fibers into the mixing chamber, bubbling air through the liquid and fibers by aspiration and then returning the mixture to the holding tank is repeated until the desired slurry mixture is obtained.

The slurry may then be transferred to the electrolytic cell where it is to be used to form a diaphragm.

The invention, as well as other objects and advantages thereof, will best be understood when the following detailed description is read in connection with the accompanying drawing illustrating an apparatus useful in practicing this invention.

Referring to the drawing, there is shown apparatus, indicated generally by the numeral 10, comprising an enclosed mixing chamber 12 including side walls 14, and walls 16, 18, a tubular element 20 extending downwardly from the lower end wall 18, the interior of the element 20 communicating with the interior of the chamber 12.

A tube 32 having a side tube 24 extending therefrom is coupled to the interior of the chamber 12 through the end wall 16.

Tube 32 has a valve 26 disposed above the side tube 24. The side tube 24 contains a valve 28 and is adapted to be coupled to an aspirator (not shown).

A holding tank 30 is disposed beneath the chamber 12, the tubular element 20 extending almost to the bottom of the tank 30.

In operation, wetted asbestos fibers are placed in the tank 30 along with enough liquid to make a slurry of predetermined density.

With the valve 26 closed and valve 28 open and the tube 24 coupled to the aspirator (not shown), the materials in the tank 30 are drawn into the mixing chamber 12. After the material is in the chamber 12, air is drawn up the element 20, bubbling vigorously through the contents of the chamber 12 and consequently causing mixing within the chamber.

After air is bubbled through the chamber contents for a short time, the valve 26 is opened, releasing the suction in the chamber 12 and dropping the contents thereof into the tank 30.

The valve 26 is then closed and the tank contents are aspirated again into the chamber 12 where more air bubbling and mixing occurs.

The valve 26 is again opened, returning the chamber contents to the tank 30. The back and forth movement of the liquid asbestos fibers mixture between the tank 30 and chamber 12 is repeated until the desired mixing occurs.

Because of the serious health hazard involved in working with asbestos fibers, it is important that the fibers be wetted before being placed in the holding tank 30. One wetting method successfully used involved puncturing the bags of fibers and then subjecting the bags, while covered, to live steam for several hours (the time depends on the number and size of the fiber bags and the steam application means).

The holding tank and mixing chamber may be easily cleaned by flushing with liquid.

The liquid used in mixing the slurry is usually cell effluent from the type of electrolytic cell in which the slurry will be used to form a diaphragm.

What is claimed is:

1. A method of preparing a slurry containing asbestos fibers comprising:
   A. Wetting said fibers;
   B. Adding said wetted fibers and a predetermined amount of liquid to a holding vessel;
   C. Aspirating said liquid and fibers into a mixing chamber;
   D. Vigorously bubbling air through said liquid and fibers in said mixing chamber to agitate said liquid and fibers; and
   E. Returning said liquid and fibers to said holding vessel.

2. A method in accordance with claim 1, wherein said liquid and fibers are successively aspirated into said mixing chamber, agitated and returned to said holding vessel for several cycles.

3. A method in accordance with claim 1, wherein said fibers constitute predetermined amounts of long and short fibers.

4. A method in accordance with claim 1, wherein said liquid and fibers are returned to said holding vessel by breaking the vacuum resulting from said aspirating.

* * * * *